(12) United States Patent
Chu et al.

(10) Patent No.: US 10,314,025 B1
(45) Date of Patent: Jun. 4, 2019

(54) SYSTEMS AND METHODS FOR PERFORMING MEDIA ACCESS CONTROL CONSIDERATION FOR MULTI-USER TRANSMISSION

(71) Applicant: Marvell International Ltd., Hamilton (BM)

(72) Inventors: Liwen Chu, San Ramon, CA (US); Hongyuan Zhang, Fremont, CA (US); Yakun Sun, San Jose, CA (US); Lei Wang, San Diego, CA (US); Jinjing Jiang, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 129 days.

(21) Appl. No.: 15/422,235

(22) Filed: Feb. 1, 2017

Related U.S. Application Data

(60) Provisional application No. 62/290,190, filed on Feb. 2, 2016.

(51) Int. Cl.
*H04W 72/04* (2009.01)
*H04L 1/16* (2006.01)

(52) U.S. Cl.
CPC ......... *H04W 72/042* (2013.01); *H04L 1/1671* (2013.01)

(58) Field of Classification Search
CPC .................................................. H04W 72/042
See application file for complete search history.

(56) References Cited

U.S. PATENT DOCUMENTS

| | | | | |
|---|---|---|---|---|
| 6,868,277 B1* | 3/2005 | Cerwall | ............... | H04W 72/085 370/329 |
| 7,502,614 B2* | 3/2009 | Uchida | .................. | H04W 36/30 370/331 |
| 2009/0005058 A1* | 1/2009 | Kazmi | .................. | H04W 16/10 455/452.1 |
| 2010/0254338 A1* | 10/2010 | Tanaka | .................. | H04W 48/12 370/329 |
| 2011/0013592 A1* | 1/2011 | Uemura | ................ | H04W 24/10 370/331 |
| 2018/0167960 A1* | 6/2018 | Zhang | .................. | H04W 28/04 |

* cited by examiner

*Primary Examiner* — Bo Hui A Zhu

(57) ABSTRACT

Systems and methods are provided for performing multi-user transmissions across different segments of a transmission medium. A connection between a first access point and a plurality of stations is established; wherein a first station of the plurality of stations detects that a primary channel of communication between the first access point and the plurality of stations is being used for transmission by a second access point. The first access point allocates a transmission channel to the first station to communicate with the first access point. The first access point determines whether an acknowledgement from the first station is received. In response to determining that the acknowledgement has been received, the first access point allocates a resource unit to the first station using the transmission channel. In response to determining that the acknowledgement has not been received, the first access point reallocates the first station to a different transmission channel.

20 Claims, 5 Drawing Sheets

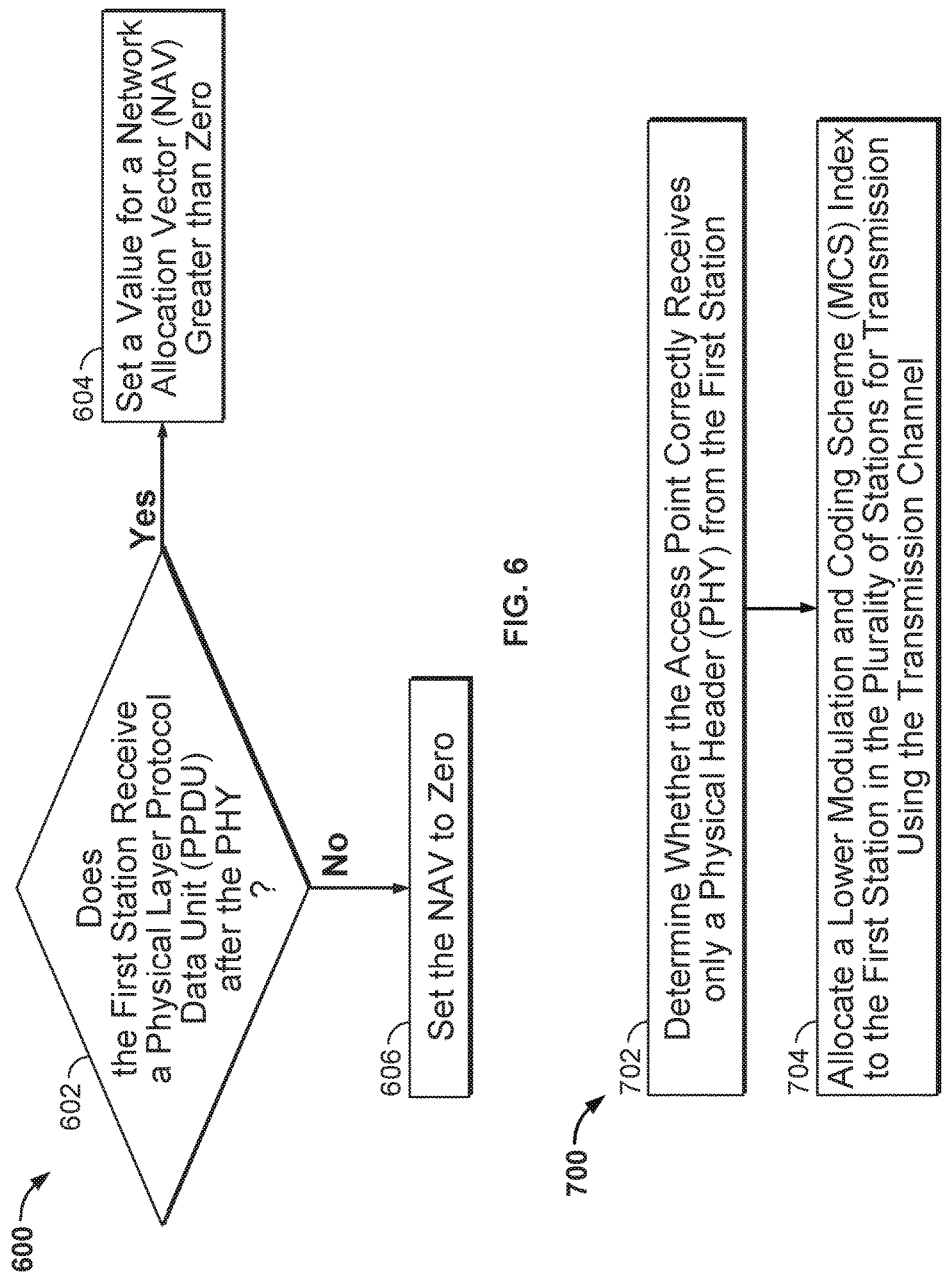

SYSTEMS AND METHODS FOR PERFORMING MEDIA ACCESS CONTROL CONSIDERATION FOR MULTI-USER TRANSMISSION

CROSS REFERENCE RELATED APPLICATION

This application claims the benefit under 35 U.S.C. § 119(e) of U.S. Provisional Application No. 62/290,190, filed on Feb. 2, 2016 which is hereby incorporated by reference herein in its entirety.

FIELD OF USE

This disclosure is generally directed to performing non-contiguous multi-user (MU) transmissions, and more particularly to media access control (MAC) consideration for providing non-contiguous MU channel bonding in transmissions.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Channel bonding is a computer networking arrangement in which two or more network interfaces on a host computer are combined for redundancy or increased throughput. The combining of two channels and the increase in throughput depend on various factors.

In current methods of channel bonding the host computer does not transmit the channel header in channels that are detected to be busy. Thus, channels that are detected to be busy by the host computer go unused. This leads to loss of time and under-utilization of signal bandwidth for transmission.

SUMMARY

In view of the foregoing, systems and methods are provided for performing multi-user transmissions across different segments of a transmission medium.

According to one aspect of the disclosure, a connection between a first access point and a plurality of stations is established, wherein a first station of the plurality of stations detects that a primary channel of communication between the first access point and the plurality of stations is being used for transmission by a second access point. The first access point allocates a transmission channel to the first access point the first station to communicate with the first access point. The first access point determines whether the first access point receives an acknowledgement from the first station of the plurality of stations. If the first access point receives an acknowledgment from the first station, the first access point allocates a resource unit to the first station using the transmission channel. And if the first access point does not receive an acknowledgment from the first station, the first access point reallocates the first station to a different transmission channel.

In some embodiments, the first access point receives a preferred channel from the first station. The first station determines, whether the transmission channel is same as the preferred channel. In response to determining at the first station that the transmission channel is the same as the preferred channel, the first station decodes the resource allocation information and sends an acknowledgement to the first access point. In response to determining at the first station that the transmission channel is not the same as the preferred channel, the first station does not send an acknowledgment to the first access point.

In some embodiments, the transmission channel is allocated to a second station in the plurality of stations. In some embodiments, the resource unit allocation information is part of the physical header (PHY) continuously transmitted in the frequency domain.

In some embodiments, the first station determines whether a physical layer convergence protocol data unit (PPDU) was received after the PHY. If the first station receives the PPDU after the PHY, a value for a network allocation vector (NAV) greater than zero is set by the first station. If the first station does not receive the PPDU after the PHY, the NAV is set to zero by the first station. In some embodiments, the NAV is determined by extracting a duration of transmission from the PHY.

In some embodiments, the first access point determines whether only a PHY was received from the first station. In response to determining that the first access point receives only a physical header (PHY) from the first station, allocating, by the first access point, a lower modulation and coding scheme (MCS) index to the first station of the plurality of stations for transmission using the transmission channel. In some embodiments, in response to determining that the first access point receives only a physical header (PHY) from the first station, the first access point allocates a lower modulation and coding scheme (MCS) index to the first station of the plurality of stations for transmission using the different transmission channel.

In some embodiments, a width of the transmission channel is less than or equal to a width of the different transmission channel.

In some embodiments, the transmission channel and the different transmission channel have no overlap.

BRIEF DESCRIPTION OF DRAWINGS

Further features of the disclosure, its nature and various advantages will be apparent upon consideration of the following detailed description, taken in conjunction with the accompanying drawings, in which:

FIG. 6 shows a flow diagram for setting an NAV value based on a received signal in accordance with an embodiment of the present disclosure; and FIG. 7 shows a flow diagram for allocating a modulation and coding scheme index to a station for transmission in accordance with an embodiment of the present disclosure.

DETAILED DESCRIPTION

To provide an overall understanding of the disclosure, certain illustrative embodiments will now be described in connection with systems and methods for performing non-contiguous multi-user transmissions. However, the systems and methods described herein may be adapted and modified as appropriate for the application being addressed and the systems and methods described herein may be employed in other suitable applications, and that such other additions and modifications will not depart from the scope thereof.

Figure 1:
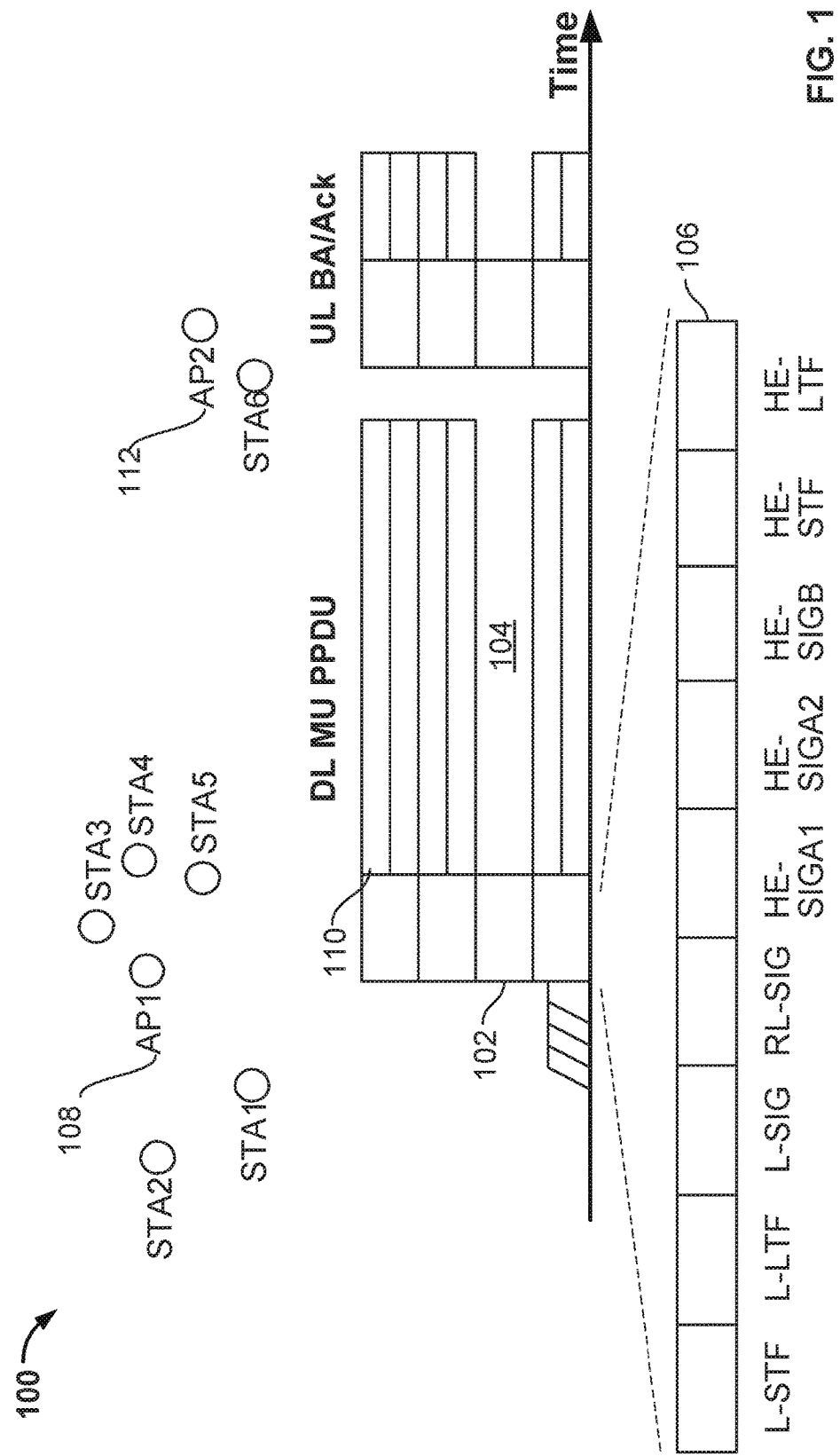
FIG. 1 shows a schematic diagram of an illustrative transmission channel allocated by an access point between different stations (STA) in accordance with an embodiment of the present disclosure.

FIG. 1 shows a schematic diagram of an illustrative transmission channel allocated by an access point to different stations in accordance with an embodiment of the present disclosure. The system 100 in FIG. 1 includes an access point 108 (AP). In some embodiments, access point 108 includes one or more various circuitries such as control circuitry, encoding circuitry, decoding circuitry, transmission circuitry, receiving circuitry, memory circuitry, processing circuitry and integrated circuitry that may combine the various circuitries together. The functions discussed in this disclosure with respect to access point 108 may be performed by control circuitry or any combination of the other circuitries that form part of access point 108.

Access point 108 and stations STA1, STA2, STA3, STA4, STA5 (also referred as STA), constitute a network. Only those STA that are part of the network may communicate with access point 108. All STAs part of the network, are considered to be associated with access point 108. In some embodiments, access point 108 may have less or more STA as part of the network. For example, in FIG. 1, access point 112 has only STA6 as part of the network of access point 112. For each network, the medium of transmission may be divided into various segments. Each medium of transmission contains only one primary channel 104 and at least one secondary channel band 110. In some embodiments, the medium of transmission may contain more than one secondary channel bands as segments of the medium of transmission. In some embodiments, stations STA linked to access point 108 may be in close proximity to access point 108. In some embodiments, stations STA include one or more various circuitries such as control circuitry, encoding circuitry, decoding circuitry, transmission circuitry, receiving circuitry, memory circuitry, processing circuitry and integrated circuitry that may combine the various circuitries together. The functions discussed in this disclosure with respect to stations STA may be performed by control circuitry or any combination of the other circuitries that form part of a STA.

Access point 108 attempts to obtain access to primary channel 104 to communicate with one or more stations associated with access point 108. The spectrum shown in FIG. 1 is divided into many different channels of which channel 104 is part of. In some embodiments, access point 108 may broadcast information to one or more stations associated with access point 108. This transmission from access point to stations STA is known as downlink (DL). In some embodiments, one or more stations may upload information to access point 108. This transmission from station STA to access point 108 is known as the uplink of information (UL).

In some embodiments, primary channel 104 is detected to be busy by access point 108. Access point 108 may detect a channel that is busy by detecting transmission of a physical header (PHY) 102 from a station STA6 or transmission of a message from an access point 112 that access point 108 or STAS associated with access point 108 are not in communication with. In some embodiments, access point 108 may detect primary channel 104 as busy if a predetermined portion of the primary channel is occupied with transmissions. For example, the predetermined portion may be 10%, 20%, 50% of the channel width and so on. The predetermined portion may be determined by a developer at the time of programming access point 108. Each transmission of a communication between any access point 108 and station STA is accompanied by a header 102 that carries the metadata of the communication. In some embodiments, DL communication generally comprises a header 102 and a physical layer convergence protocol data unit (PPDU) containing the information to be transmitted. In some embodiments, UL communication generally comprises a header 102 and an Access Control Protocol Data Unit (A-MPDU) containing the information to be transmitted. In some embodiments, header information 106 may include the variables like L-STF, L-LTF, RL-SIG, HE-SIGA1, HE-SIGA2, HE-SIGB, HE-STF, HE-LTF as shown in FIG. 1. From header information 106, access point 108 may determine a duration of transmission of data between access point 112 and STA6 over channel 104. Until the transmission between STA6 and access point 112 over channel 104 is complete, access point may detect channel 104 to be busy.

While communication between access point 112 and STA6 is in progress, access point 108 may broadcast physical header (PHY) 102 for a different communication within the network of access point 108 in busy primary channel 104. Access point 108 may not transmit the Physical Layer Convergence Protocol Data Unit (PPDU) 110 after the PHY 102.

STA2 associated with access point 108 may not detect the transmission of information between access point 112 and STA6 and so STA2 may detect the channel 104 as idle (not busy).

While the primary channel may be busy and unable to facilitate communication between access point 108 and STA, STA may use the primary channel 104 to perform functions associated with transmission as described with respect to FIGS. 4-7 in this disclosure. This division of a transmission medium for the use by STA and access point 108 is known as non-contiguous transmission.

In some embodiments, STA requires resource units (RU) to process the A-MPDU and PPDU information. Each station is allocated a channel to decode the RU allocation information by access point 108 and the information for allocation of the RU is encoded in the header information 106. The allocation of channels for station is discussed in more detail with respect to FIG. 5.

UL transmission starts with a legacy duplicate trigger frame. In non-contiguous UL MU transmission, the trigger frame and multi-station block acknowledgement (BA) frames may use non-contiguous channels. In some embodiments, a new duplicate PPDU mode is redefined where the channels for duplicate transmissions may be non-continuous and the rotation of transmission in one channel is the same as continuous duplicate transmission in the same channel. In some embodiments, the duplicate transmissions are not accomplished in busy primary channel 104. In some embodiments, the trigger frame is transmitted in the DL orthogonal frequency division multiplexing application when the available channels are not continuous.

When the primary channel 104 is determined to be busy by station STA, station STA in the plurality of stations may attempt to decode resource unit (RU) allocation information in secondary channels 110. In such circumstances, station STA indicates a preferred secondary channel to access point 108 for decoding the RU information. In some embodiments, access point 108 may not be able to allocate the indicated preferred channel to STA. In that case, station STA does not communicate with the access point 108 as the STA does not use a channel other than the indicated preferred channel to decode the PHY 102 to obtain the RU information.

Figure 2:
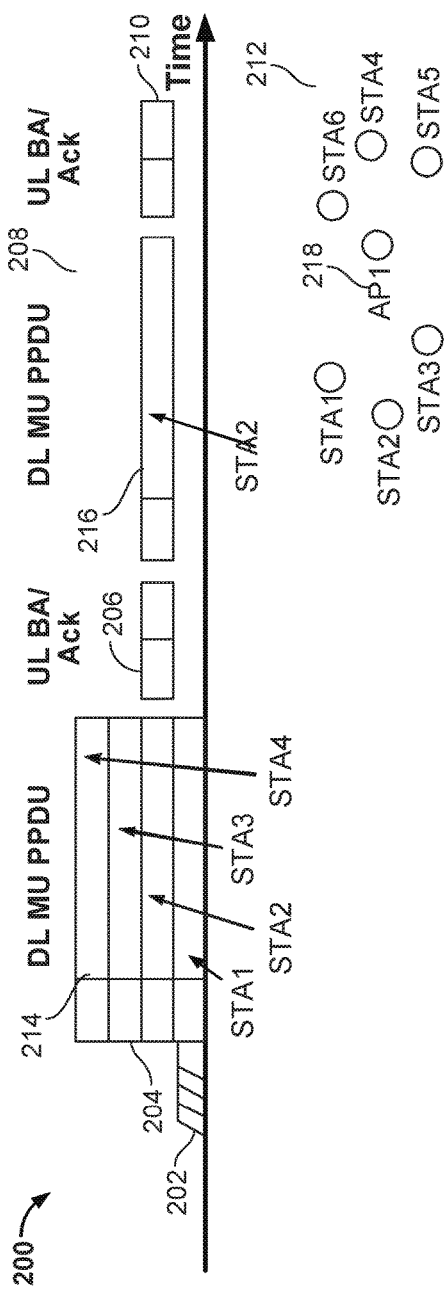
FIG. 2 shows a schematic diagram of an illustrative transmission channel where an access point is in communication with a plurality of stations in accordance with an embodiment of the present disclosure.

FIG. 2 shows a schematic diagram of an illustrative transmission channel where an access point is in communication with a plurality of stations (STAs) in accordance with an embodiment of the present disclosure.

FIG. 2 is a representation of different stages of the transfer of information 202 from access point 108 to at least one STA over time. Network 212 depicts an access point 218 and a collection of stations STA1, STA2, STA3, STA4, STA5, and STA6 (also known as STA). Transmission of information 202 over the network 212 is accompanied by transmission of header 204 and PPDU 214 from access point 218 to each STA. Access point 218 has divided the available transmission channels and assigned it to various STAs, STA1, STA2, STA3, and STA4 from the group of STAs associated part of the network of access point 218. In every network, there is only one primary channel which may be detected to be busy as shown in FIG. 1. Access point 218 may assign secondary channels to a subset of STAs associated with access point 218. From among the assigned STAS, the access point 218 receives an acknowledgement 206 only from STA2. Access point 218 receives an acknowledgement 206 from STA2 only when the secondary channel to STA2 is same as the preferred channel indicated by STA2. The receipt of acknowledgement 206 at access point 218 establishes a connection between the access point 108 and STA2. Once a connection has been established, access point 108 transmits information 216 to STA2 over the assigned channel at 208. On the receipt of information at STA2, STA2 sends acknowledgement 210 to access point 108.

In some embodiments, STA may transmit information to access point 218. In case of an UL transmission, the access point 218 still distributes the transmission channel among a subset of STA associated with access point 218. In case of UL transmission, access point 218 receives a UL block acknowledgement (BA) 206 as depicted in FIG. 2 along with A-MPDU containing the transmitted information.

Figure 3:
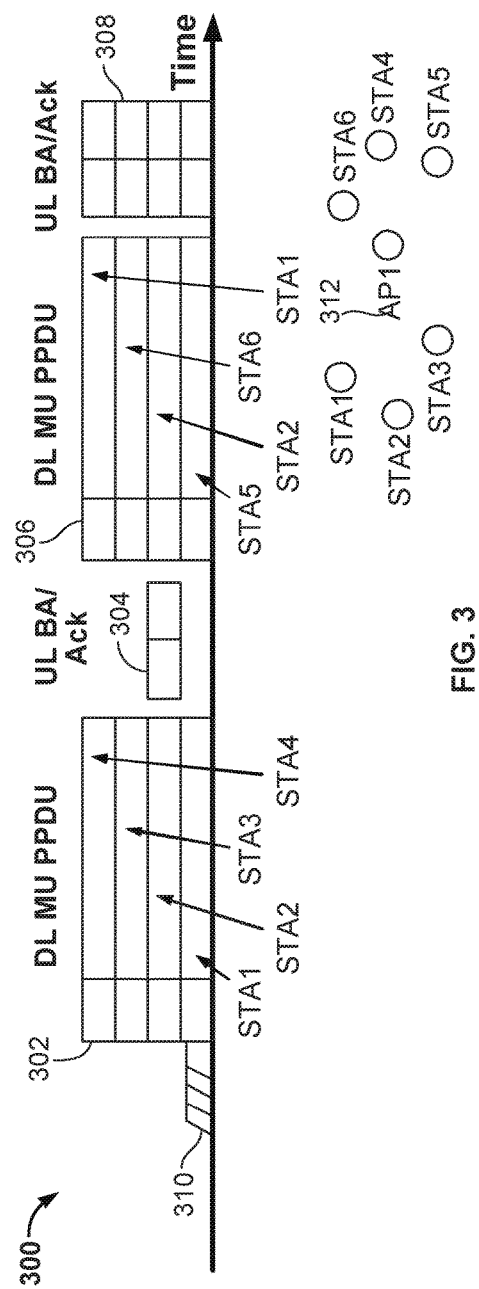
FIG. 3 shows a schematic diagram of an illustrative transmission channel where an access point is in communication with a plurality of stations in accordance with another embodiment of the present disclosure.

FIG. 3 shows a schematic diagram of an illustrative transmission channel where an access point is in communication with a plurality of stations (STAs) in accordance with another embodiment of the present disclosure. FIG. 3 is the same as FIG. 2, except in FIG. 3, after access point 312 does not receive an acknowledgement from STA 1, STA 3, and STA4, access point 312 reassigns the unsuccessful secondary channels to different stations, STA 5 and STA 6 at 306. Access point 312 also assigns STA1 to a different channel, where the new channel does not overlap with the unsuccessful secondary channel of STA1 at 306. Once the secondary channels are reassigned, access point 312 receives an acknowledgement 308 from all assigned STAs for transmission of information.

Figure 4:
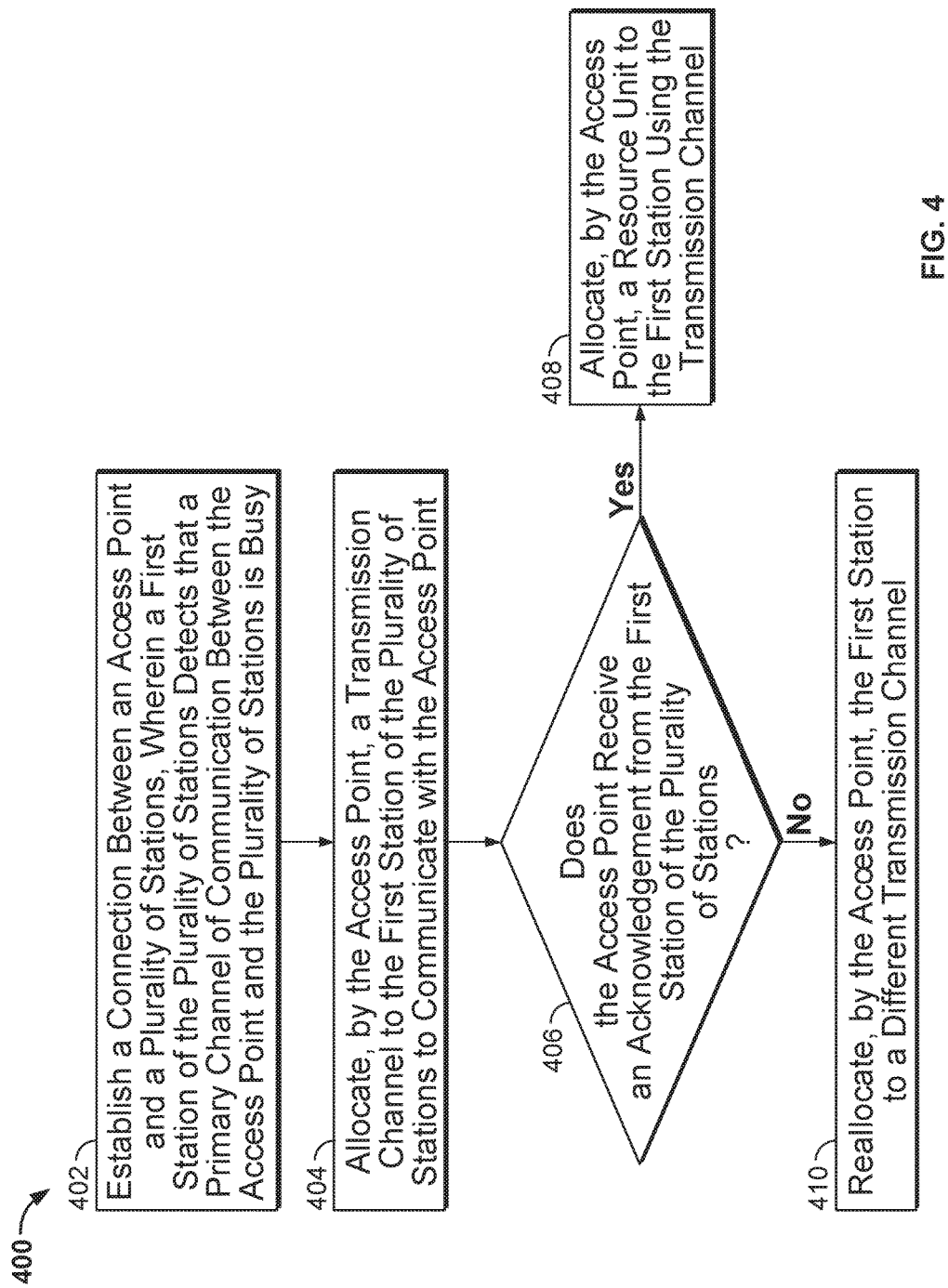
FIG. 4 shows a flow diagram for establishing a connection between an access point and at least one station in a plurality of stations over a busy transmission channel in accordance with an embodiment of the present disclosure.

FIG. 4 shows a flow diagram of a process 400 to establish a connection between an access point 108 and at least one station in accordance with an embodiment of the present disclosure. At 402, a connection between access point 108 and a plurality of stations STAs is established. A first station of the plurality of stations detects that a primary channel of communication between access point and the plurality of stations is busy. The process of detection a channel is busy is described in detail with respect to FIG. 1.

At 404, access point 108 allocates a transmission channel other than the primary channel to the first station of the plurality of stations STAs to communicate with access point 108. For example, as shown with respect to FIG. 2, access point 218 allocates the secondary channels associated with a transmission channel to a subset of STAs associated with access point 218 upon detecting that the primary channel 104 is busy.

At 406, access point 108 determines whether an acknowledgement from the first station of the plurality of stations is received. If the acknowledgement is received at 406, access point 108 allocates an RU to the first station in the PHY 102 using the primary channel at 408. Exemplary embodiments of receiving an acknowledgement from a station are described with respect to FIG. 2. If the acknowledgement is not received at 406, access point 108 reallocates the first station to a different transmission channel at 410. As shown with respect to FIG. 2, access point 218 receives acknowledgement 206 from STA2 out of the subset of STAs that were assigned the secondary channels. When the acknowledgement from STA2 is received, access point 218 proceeds to allocate RU to STA2 using the secondary channel. In case of STA1, STA3, and STA4 where access point 218 does not receive acknowledgment 206, there is no communication between access point 218 and STAs. In some embodiments, access point 108 may also allocate the unsuccessful channel to a different station. Exemplary embodiments of reallocating the transmission channel and assigning station STA to a new channel are described with respect to FIG. 3. As shown with respect to FIG. 3, when access point 312 does not receive an acknowledgment 304 from STA1, STA2, and STA4, access point 312 reassigns the unsuccessful secondary channels to STA5 and STA6.

Figure 5:
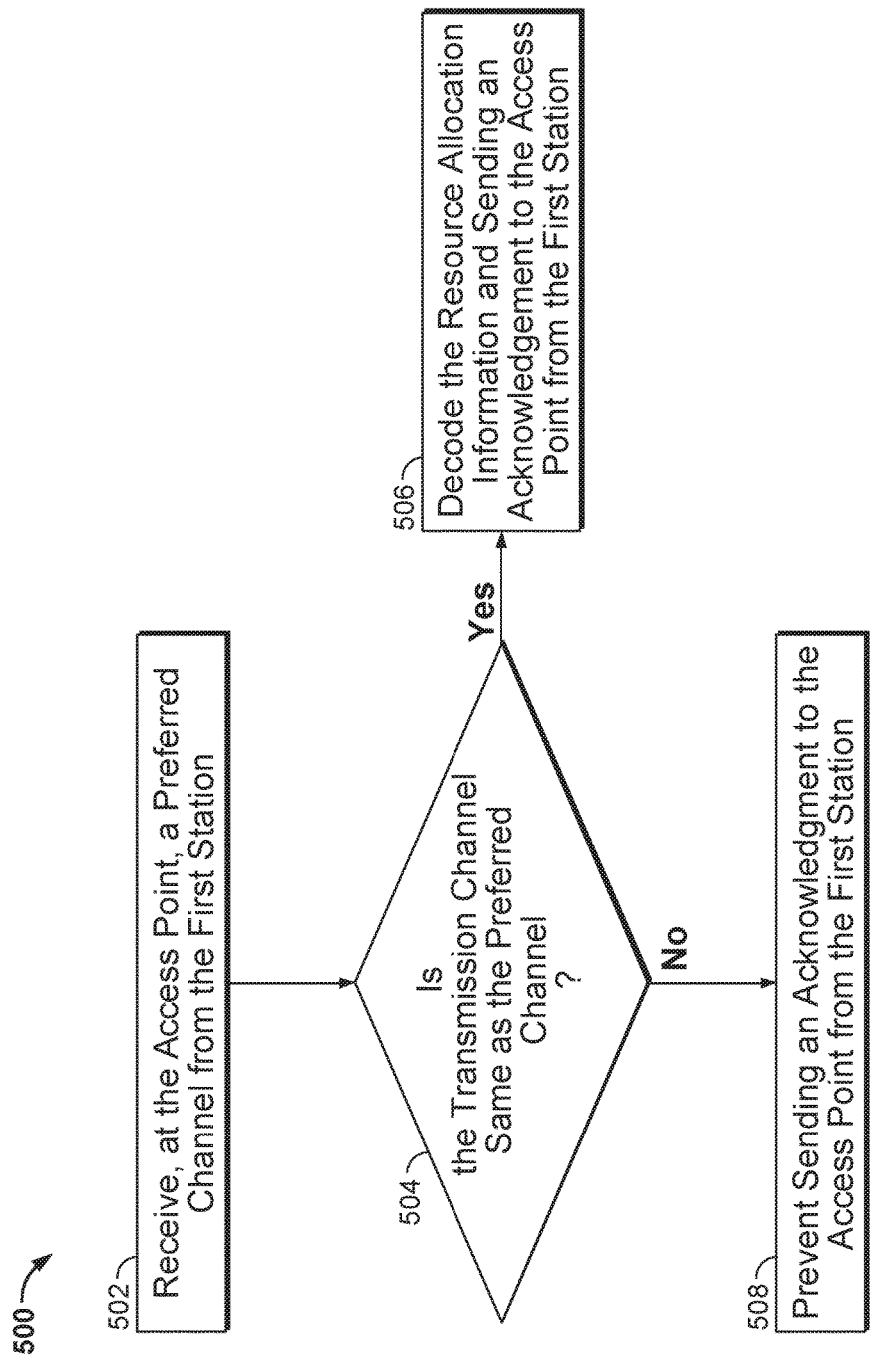
FIG. 5 shows a flow diagram for allocating a preferred transmission channel to a station in accordance with an embodiment of the present disclosure.

FIG. 5 shows a flow diagram of a process for allocating a preferred transmission channel to a station in accordance with an embodiment of the present disclosure. The process 500 in FIG. 5 starts at 502 when access point 108 receives a preferred channel from station. This happens when station STA detects that the primary channel 104 is busy. In such cases, access point 108 allocates a channel to each station STA for processing PHY 102. The channel allocated to station by access point 108 may be different or same as the indicated preferred channel by station STA. For example, as described with respect to FIG. 1, upon detecting that primary channel 104 is busy each STA belonging to a network of access point 108 sends an indication of a preferred secondary channel to decode the RU allocation information.

At 504, the first station determines if the allotted transmission channel to station STA is same as the indicated preferred channel of the first station. If the first station determines that the allotted channel is same as the indicated preferred channel at 504, station STA decodes the resource allocation information from PHY 102 and sends an acknowledgement to access point 108 at 506. If the first station determines that the allotted channel is not same as the indicated preferred channel at 504, station STA does not send an acknowledgement to station STA at 508. For example, as described with respect to FIG. 2, access point 218 receives acknowledgement 206 from STA2 out of the subset of STAs that were assigned the secondary channels. When the acknowledgement from STA2 is received, access point 218 proceeds to allocate RU to STA2 using the secondary channel. In case of STA1, STA3, and STA4, the assigned secondary channel does not match the preferred secondary channel indicated by STAs and there is no allocation of RU by access point 218.

FIG. 6 shows a flow diagram of a process for setting an NAV value based on a received signal in accordance with an embodiment of the present disclosure. The NAV value is determined from the header information 106. The NAV is a counter that is indicative of the duration extracted from PHY 102 of transmission of the message from access point 108 to station STAs or from a station to access point 108. The setting of the NAV value to a non-zero value indicates that the transmission channel is busy until the NAV counts down to zero. If there is no PPDU after the signal and station STA sets the NAV to a non-zero value, the transmission channel is marked as busy even though station STA is not receiving information. The transmission channel marked as busy cannot be used for any activity until the NAV counter counts down to zero. Instead, this transmission channel may be used for transmission or decoding the RU allocation information. The process 600 in FIG. 6 starts at 602 when station STA receives a PHY 102 and determines whether a PPDU was received after the PHY 102.

If the PPDU is not received after the PHY 102, station STA sets the NAV value to 0 at 606. In cases when station STA does not receive a PPDU signal in a transmission channel after the PHY 102, and the PPDU is received after the PHY 102 station STA sets a non-zero NAV value at 604.

In some embodiments, the duration of transmission is governed by a target wake-up time (TWT). Target wake-up time is a predetermined length of time for which primary channel 104 is determined to be busy. For example, in FIG. 1, access point 112 is allowed to transmit information in primary channel 104. While this transmission is in progress, the channel is determined to be busy by access point 108 and STAs. At the end of TWT, access point 112 stops transmission in primary channel 104 and access point 108 or STA may start transmission in primary channel 104. During the time access point 108 is not transmitting in primary channel 104, access point 108 allocates channels other than the primary channel to STAs for decoding RU allocation information as described in detail FIGS. 2-6.

FIG. 7 shows a flow diagram of a process for allocating a modulation and coding scheme (MCS) index to a station for transmission in accordance with an embodiment of the present disclosure. The MCS value is a unique reference that reflects the throughput of a signal. The lower the signal, lower the throughput of the signal. Assigning a low MCS value to a station for transmission indicates a lower priority for the transmission from station STA. Process 700 of FIG. 7 begins at 702 when access point 108 determines whether only a PHY 102 has been correctly received from a station. At 704, access point 108 allocates a lower MCS index to station STA for transmission.

In some embodiments, any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for performing multi-user transmissions across different segments of a transmission medium, the method comprising:
   establishing a connection between a first access point and a plurality of stations, wherein a first station of the plurality of stations detects that a primary channel of communication between the first access point and the plurality of stations is being used for transmission by a second access point;
   allocating, by the first access point, a transmission channel to the first station of the plurality of stations to communicate with the first access point;
   determining whether the first access point receives an acknowledgement from the first station of the plurality of stations;
   in response to determining that the acknowledgement has been received from the first station, allocating, by the first access point, a resource unit to the first station using the transmission channel; and
   in response to determining that the acknowledgement has not been received from the first station, reallocating, by the first access point, the first station to a different transmission channel.

2. The method of claim 1, wherein receiving the acknowledgement further comprises:
   receiving, at the first access point, a preferred channel from the first station;
   determining, at the first station, whether the transmission channel is the same as the preferred channel;
   in response to determining at the first station that the transmission channel is the same as the preferred channel, decoding the resource allocation information and sending an acknowledgement to the first access point from the first station; and
   in response to determining at the first station that the transmission channel is not the same as the preferred channel, not sending an acknowledgment to the first access point from the first station.

3. The method of claim 1, wherein a second station from the plurality of stations is allocated to the transmission channel.

4. The method of claim 1, wherein the resource unit allocation information is part of a physical header (PHY) continuously transmitted in the frequency domain.

5. The method of claim 4, further comprising:
   determining whether the first station receives a physical layer convergence protocol data unit (PPDU) after the PHY;
   in response to determining that the first station receives the PPDU after the PHY, setting a value for a network allocation vector (NAV) greater than zero; and in response to determining that the first station does not receive the PPDU after the PHY, setting the NAV to zero.

6. The method of claim 5, wherein the NAV is determined by extracting a duration of transmission from the PHY.

7. The method of claim 1, further comprising:
determining whether the first access point receives only a physical header (PHY) from the first station; and
in response to determining that the first access point receives only a physical header (PHY) from the first station, allocating, by the first access point, a lower modulation and coding scheme (MCS) index to the first station of the plurality of stations for transmission using the transmission channel.

8. The method of claim 7, further comprising:
in response to determining that the first access point receives only a physical header (PHY) from the first station, allocating, by the first access point, a lower modulation and coding scheme (MCS) index to the first station of the plurality of stations for transmission using the different transmission channel.

9. The method of claim 1, wherein a width of the transmission channel is less than or equal to a width of the different transmission channel.

10. The method of claim 1, wherein the transmission channel and the different transmission channel have no overlap.

11. A system for performing multi-user transmissions across different segments of a transmission medium, the system comprising:
processing circuitry configured to:
establish a connection between a first access point and a plurality of stations, wherein a first station of the plurality of stations detects that a primary channel of communication between the first access point and the plurality of stations is being used for transmission by a second access point;
allocate, by the first access point, a transmission channel to the first station of the plurality of stations to communicate with the first access point;
determine whether the first access point receives an acknowledgement from the first station of the plurality of stations;
in response to determining that the acknowledgement has been received from the first station, allocate, by the first access point, a resource unit to the first station using the transmission channel; and
in response to determining that the acknowledgement has not been received from the first station, reallocate, by the first access point, the first station to a different transmission channel.

12. The system of claim 11, wherein the processing circuitry is further configured to receive the acknowledgement by:
receiving, at the first access point, a preferred channel from the first station;
determining, at the first station, whether the transmission channel is the same as the preferred channel;
in response to determining at the first station that the transmission channel is the same as the preferred channel, decoding the resource allocation information and sending an acknowledgement to the first access point from the first station; and
in response to determining at the first station that the transmission channel is not the same as the preferred channel, not sending an acknowledgment to the first access point from the first station.

13. The system of claim 11, wherein a second station from the plurality of stations is allocated to the transmission channel.

14. The system of claim 11, wherein the resource unit allocation information is part of a physical header (PHY) continuously transmitted in the frequency domain.

15. The system of claim 14, wherein the processing circuitry is further configured to:
determine whether the first station receives a physical layer convergence protocol data unit (PPDU) after the PHY;
in response to determining that the first station receives the PPDU after the PHY, set a value for a network allocation vector (NAV) greater than zero; and
in response to determining that the first station does not receive the PPDU after the PHY, set the NAV to zero.

16. The system of claim 15, wherein the NAV is determined by extracting a duration of transmission from the PHY.

17. The system of claim 11, wherein the processing circuitry is further configured to:
determine whether the first access point receives only a physical header (PHY) from the first station; and
allocate, by the first access point, a lower modulation and coding scheme (MCS) index to the first station of the plurality of stations for transmission using the transmission channel, in response to determining that the first access point receives only a physical header (PHY) from the first station.

18. The system of claim 17, wherein the processing circuitry is further configured to:
allocate, by the first access point, a lower modulation and coding scheme (MCS) index to the first station of the plurality of stations for transmission using the different transmission channel, in response to determining that the first access point receives only a physical header (PHY) from the first station.

19. The system of claim 11, wherein a width of the transmission channel is less than or equal to a width of the different transmission channel.

20. The system of claim 11, wherein the transmission channel and the different transmission channel have no overlap.

* * * * *